(12) United States Patent
Wolff et al.

(10) Patent No.: US 6,201,903 B1
(45) Date of Patent: *Mar. 13, 2001

(54) METHOD AND APPARATUS FOR PEN-BASED FAXING

(75) Inventors: Gregory J. Wolff, Mountain View; David G. Stork, Portola Valley; Michael Angelo, Redwood City, all of CA (US)

(73) Assignees: Ricoh Company, Ltd., Tokyo (JP); Ricoh Corporation, Menlo Park, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/940,832

(22) Filed: Sep. 30, 1997

(51) Int. Cl.⁷ ................ G06K 9/20; G06K 9/22
(52) U.S. Cl. ............. 382/317; 382/313; 382/122; 382/188; 382/187; 358/473; 358/440
(58) Field of Search ................ 382/317, 313, 382/122, 188, 187, 121; 358/474, 437, 440, 404, 444, 473; 178/19.05, 19.01, 19.04; 702/141; 341/22

(56) References Cited

U.S. PATENT DOCUMENTS

| Re. 29,765 | 9/1978 | Crane et al. | 73/862.044 |
|---|---|---|---|
| D. 362,663 | 9/1995 | Nguyen | D14/107 |
| 3,906,444 | 9/1975 | Crane et al. | 382/122 |
| 3,915,015 | 10/1975 | Crane et al. | 73/865.4 |
| 4,142,175 * | 2/1979 | Herbst et al. | 382/314 |
| 4,241,409 | 12/1980 | Nolf | 708/107 |
| 4,345,239 | 8/1982 | Elliott | 382/122 |
| 4,468,694 | 8/1984 | Edgar | 348/135 |
| 4,513,437 | 4/1985 | Chainer et al. | 382/120 |
| 4,545,018 | 10/1985 | Clements et al. | 700/166 |

(List continued on next page.)

FOREIGN PATENT DOCUMENTS

| 43 26371 A1 | 4/1995 | (DE). | |
| 0 457 541A1 | 11/1991 | (EP). | |
| 0 615 209A2 | 9/1994 | (EP). | |
| WO 93/08542 | 4/1993 | (WO). | |
| WO 94/09447 | 4/1994 | (WO) | G06K/9/00 |
| WO 94/18663 | 8/1994 | (WO) | G09G/3/02 |
| WO 95/21436 | 8/1995 | (WO) | G09G/3/02 |
| WO 96/03737 | 2/1996 | (WO) | G09G/5/00 |
| WO 96/14633 | 5/1996 | (WO) | G09G/5/08 |

OTHER PUBLICATIONS

"Atypical mice and related devices," Computer, IEEE Computer Society, Jun. 1995, vol. 28, No. 6, Product Reviews, pp. 92 and 94.

Aeropoint™ User's Guide, Creative Labes, Inc., 1901 McCarthy Boulevard, Milpitas, CA 95035, Jul. 1995, pp. vii, 1–1, 1–3.

The DataPentm User's Guide, Primax Electronics, 254 East Hacienda Ave., Campbell, CA 95008–9638, p. 1.

"Digital pen recalls what it has written," by Michele Clarke, Magazine Article, undated.

"Electronic Blackboard Have Chalk Will Travel,", G.P. Torok, Bell Telephone Laboratories, Incorporated, Holmdel, New Jersey, Jun. 1977, pp. 19.1–22–19.1–25.

Translation by Schwabe, Sandmair, and Marz Patentanwalte of the relevant parts of the Official Letter from the German Patent Office, Jan. 29, 1998, 6 pages.

*Primary Examiner*—Cheukfan Lee
(74) *Attorney, Agent, or Firm*—Blakely, Sokoloff, Taylor & Zafman LLP (57) ABSTRACT

A method and apparatus for sending a facsimile of a message is disclosed. The present invention provides for recording pen strokes that set forth a message and sending the recorded pen strokes as part of a facsimile.

24 Claims, 9 Drawing Sheets

U.S. PATENT DOCUMENTS

| | | |
|---|---|---|
| 4,561,105 | 12/1985 | Crane et al. .................... 382/185 |
| 4,731,857 | 3/1988 | Tappert ............................ 382/178 |
| 4,751,741 * | 6/1988 | Mochinaga et al. ............ 382/188 |
| 4,787,051 | 11/1988 | Olson .............................. 345/179 |
| 4,806,707 | 2/1989 | Landmeier ................... 178/19.05 |
| 4,856,077 | 8/1989 | Rothfjell ........................ 382/123 |
| 4,883,926 | 11/1989 | Baldwin ...................... 178/19.01 |
| 4,988,981 | 1/1991 | Zimmerman et al. ......... 345/158 |
| 5,022,086 | 6/1991 | Crane et al. .................... 382/121 |
| 5,025,314 | 6/1991 | Tang et al. ........................ 348/13 |
| 5,027,115 | 6/1991 | Sato et al. ........................ 341/13 |
| 5,159,321 | 10/1992 | Masaki et al. ................. 345/179 |
| 5,164,585 | 11/1992 | Lieu ................................ 250/221 |
| 5,181,181 | 1/1993 | Glynn ............................. 702/141 |
| 5,215,397 | 6/1993 | Taguchi et al. ................. 401/194 |
| 5,226,091 | 7/1993 | Howell et al. ....................... 382/3 |
| 5,227,622 | 7/1993 | Suzuki ............................ 250/221 |
| 5,239,292 | 8/1993 | Willan ............................ 345/135 |
| 5,247,137 | 9/1993 | Epperson ..................... 178/19.04 |
| 5,294,792 * | 3/1994 | Lewis et al. .................... 382/188 |
| 5,296,871 | 3/1994 | Paley .............................. 345/163 |
| 5,357,062 * | 10/1994 | Rockwell et al. .............. 382/314 |
| 5,371,516 | 12/1994 | Toyoda et al. .................. 345/179 |
| 5,396,265 | 3/1995 | Ulrich et al. ................... 345/158 |
| 5,408,382 | 4/1995 | Schultz et al. ................. 361/686 |
| 5,434,371 | 7/1995 | Brooks ......................... 178/19.04 |
| 5,436,792 | 7/1995 | Leman et al. .................. 361/686 |
| 5,440,326 | 8/1995 | Quinn ............................ 345/156 |
| 5,444,192 | 8/1995 | Shetye et al. ................ 178/18.09 |
| 5,477,012 | 12/1995 | Sekendur ..................... 178/18.09 |
| 5,506,605 | 4/1996 | Paley .............................. 345/163 |
| 5,512,892 | 4/1996 | Corballis et al. .................. 341/22 |
| 5,517,579 | 5/1996 | Baron et al. .................... 382/187 |
| 5,526,018 | 6/1996 | Fisher ............................ 345/127 |
| 5,548,092 * | 8/1996 | Shriver ........................ 178/19.01 |
| 5,570,109 | 10/1996 | Jenson ........................... 345/146 |
| 5,574,804 * | 11/1996 | Olshafskie et al. ............ 382/313 |
| 5,633,946 * | 5/1997 | Lachinski et al. .............. 382/103 |
| 5,774,602 * | 6/1998 | Taguchi et al. ................. 382/314 |
| 5,825,044 * | 10/1998 | Allen et al. ................... 250/208.1 |

* cited by examiner

JO,
   This message would get to you through the pen based fax.

Gary

END

METHOD AND APPARATUS FOR PEN-BASED FAXING

FIELD OF THE INVENTION

The present invention relates to sending messages via facsimile (fax), and more specifically, to sending fax messages via a pen-like device.

BACKGROUND OF THE INVENTION

Typically, sending messages via facsimile (fax) requires the sender to compose a message and write information on a cover sheet to be sent along with the message. Then the user must locate a fax machine, feed the message and the cover sheet into the fax machine and dial the number of the receiving party. The user may be required to then wait for the message to be sent to confirm that the message was sent successfully.

One problem with the current process for sending fax messages is that the fax machine is not portable. When a person desires to send a fax, that person must travel to the nearest fax machine. This travel time added to the process may be inconvenient, particularly if the individual does not currently know where such a fax machine may be.

Elimination of any of the required steps would make the process of communicating via fax more convenient and efficient. Therefore, it would be desirable to provide faxing that requires a user only to perform a subset of these steps to send a fax. Furthermore, it would be desirable to eliminate the inconvenience associated with locating and traveling to a fax machine.

SUMMARY OF THE INVENTION

A method and apparatus for sending a facsimile of a message is disclosed. The present invention provides for recording pen strokes that set forth a message and sending the recorded pen strokes as part of a facsimile.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for pen-based faxing is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid obscuring the present invention.

Overview of the Present Invention

The present invention provides for using a smart sensing device, such as a specially designed pen or stylus, to send facsimile (fax) or other electronic telecommunication transmissions. In one embodiment, the device is portable.

In the present invention, the device records stroke information. Using the device, users simply write down a message on an ordinary piece of paper and the system transparently delivers the message via some mode of communication.

In one embodiment, facsimile transmissions are sent by initially writing a "fax" command (such as writing "TO:") that the pen-like device recognizes followed by an indication of the recipient. Next, a user writes down a message on a piece of paper or any surface. The present invention operates by recognizing a start, or "fax", command and recording the user's strokes with the pen-like device. The user indicates that he/she is finished writing down the message. In one embodiment, the user may provide this indication by writing a stop, or "end of fax", command. In an alternate embodiment, the user may indicate this by manipulating the pen-like device, such as by, for example, depressing a button, flipping a switch, controlling an input device on the pen-like device, or moving the device in a predetermined manner (e.g., twisting, turning, shaking, etc.). When finished, the system of the present invention automatically sends the message (e.g., document) whenever the communications medium becomes available. The finished indication provided by the user may cause a fax machine to be contacted and the user's message to be sent. In one embodiment, a rasterized version of the user's message is sent. Such a rasterized version may be created by converting strokes of the device into a bitmap.

In this manner, a document may be sent via fax without a traditional fax machine. Instead, the device used by the present invention makes it very easy to send messages at anytime from any place without the need for bulky equipment. It should be noted that the present invention may be applicable to sending messages to other telecom mediums, such as by electronic mail (e.g., email). Thus, the present invention provides for sending handwritten messages electronically (e.g., via fax) in a very efficient manner.

The following provides a description of methods and apparatus for recording pen movements, recognizing start, stop and destination specifications, communicating electronically, and storing strokes and converting strokes into bitmaps. These may be performed by hardware, software or a combination of both.

One Embodiment of the Pen System

The present invention may be performed with any pen or stylus like device that electronically records strokes. The device may record and process the strokes itself or by using some base unit that receives data from the pen.

The device includes communications facilities for communication with other electronic devices. In one embodiment, this may be any of several well-known communications mechanisms, such as an RJ11 jack that connects to the phone system, a wireless (e.g., infrared) link, or a cellular modem. Other well-known communications mechanisms may be used.

A description of one such device is given below. Other pen-like devices may be used. In one embodiment, a pen-based faxing system comprises a pen device and a base unit that functions as a communications interface. The pen contains a receiver/transmitter for transmitting position information and for receiving feedback from the base unit. The pen also includes position sensors, such as gyroscopes or infrared sensors or transmitters, and strain gauges or accelerometers for determining when strokes are being made by a user. Position information may be processed into strokes and transmitted in facsimile or other electronically compatible format either by the pen in one embodiment or by the base unit in one embodiment. Thus, a user may write a message on a piece of paper using a pen and the message is transmitted via facsimile to a designated recipient.

Figure 1:
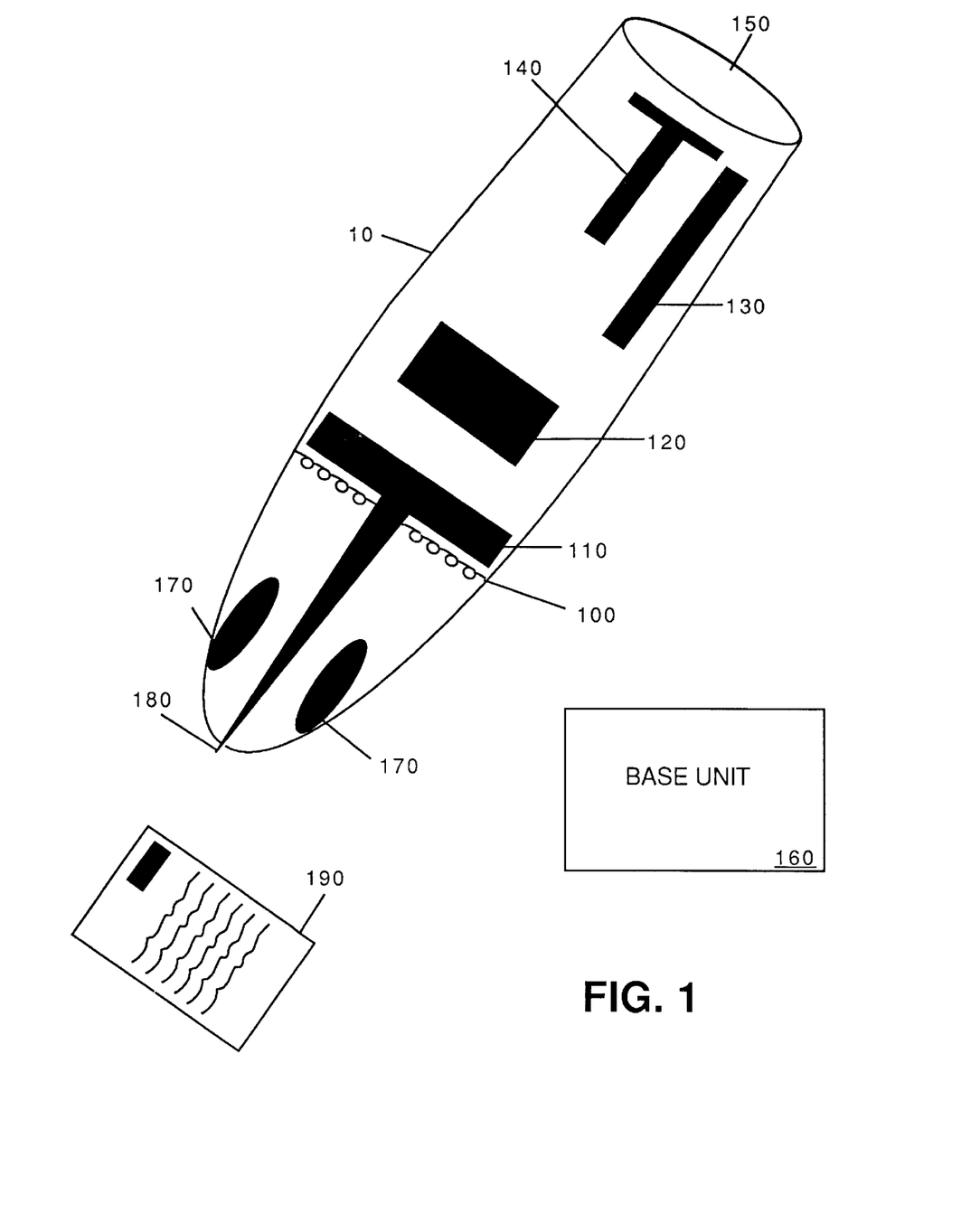
FIG. 1 is one embodiment of a pen-based device for faxing messages according to the present invention.

FIG. 1 is one embodiment of pen 10 for faxing messages according to the present invention. In one embodiment, the lower portion of pen 10 comprises strain gauges 100, ink (or other writing substance) supply 110, fine position sensors 170 and pen tip 180, while the upper portion comprises gyroscopes 120, battery 130, transmitter/receiver 140 and a display 150 (e.g., a light emitting diode (LED), liquid crystal display (LCD), etc.).

Transmitter/receiver 140 transmits and receives signals to and from base unit 160 that provides a communications link for sending a fax. In one embodiment, the outer shell of pen 10 is designed such that it can be held by the user in a predetermined way to facilitate communication. The predetermined way may be only one way or a defined set of two or more ways. Also in one embodiment, base unit 160 is included in pen 10.

To send a fax, a user uses pen 10 to write a message on plain paper 190. Pen tip 180 and ink supply 110 allow the user to write a message as he or she normally writes on a piece of paper (or other surface). Recording the message on paper 190 is not necessary to send a fax; therefore, no ink supply is necessary. However, doing so provides the user with a copy of the message sent for his or her records.

As the user writes out a message, gyroscopes 120, fine position sensors 170 and strain gauges 100 monitor the strokes being made to record the message written in the form of a series of strokes. Data from gyroscopes 120, fine position sensors 170 and strain gauges 100 are transmitted to base unit 160 via transmitter/receiver 140. Alternatively, the data from gyroscopes 120, fine position sensors 170 and strain gauges 100 may be processed and stored in pen 10. Also, in the alternative, strain gauges 100 may be replaced with accelerometers.

Another alternative is for pen 10 and base unit 160 to provide handwriting recognition. In such a system, the message sent may appear as if it had been printed by a computer or typed on a typewriter. In one embodiment, LCD 150 may provide user feedback to indicate the results of the recognition.

Transmitter/receiver 140 may also receive information from base unit 160. This information may be used internally or may provide feedback to the user via display 150. Battery 130 supplies power to the elements of pen 10.

Figure 2:
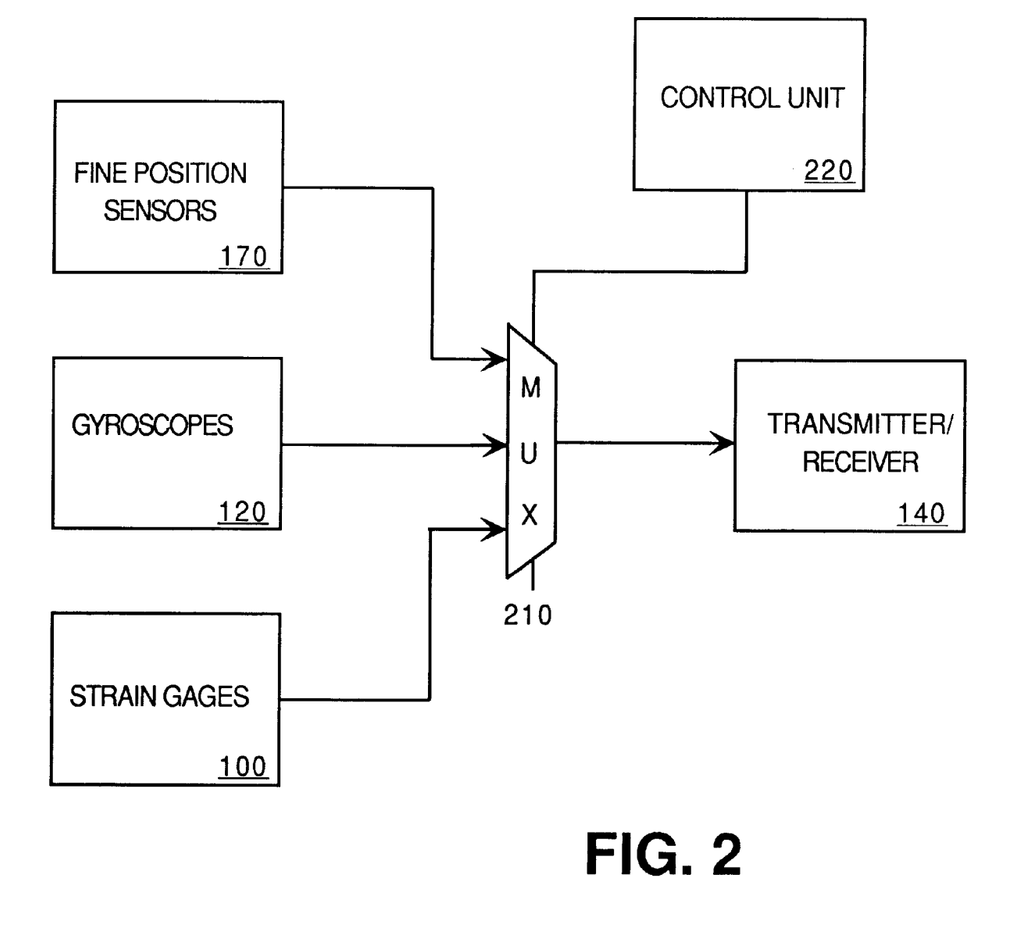
FIG. 2 is a block diagram of one embodiment of the position sensing system in a pen-based faxing system according to the present invention.

FIG. 2 is a block diagram of one embodiment of the position sensing system in a pen-based faxing system according to the present invention. Fine position sensors 170, gyroscopes 120 and strain gauges 100 generate inputs to multiplexer 210. Control unit 220 controls multiplexer 210. Transmitter/receiver 140 transmits the output of multiplexer 210.

In one embodiment, gyroscope 120 (gyro) is a rotating member continues to turn about a fixed spin axis as long as no forces are exerted on the member and the member is not accelerated. Gyro attitude transducers (free gyros) are used as two-degree-of-freedom gyros that can provide an output for the pen's three attitude planes: pitch, yaw, and roll (or x, y, and z axes). Rate gyros are attitude-rate transducers that provide an output signal proportioned to angular velocity (time rate of change of attitude). Data from gyroscopes 120 is transmitted by transmitter/receiver 140 to base unit 160.

Pen 10 further includes fine position sensors 170 that detect small movements of pen 10. Data from fine position sensors 170 is also transmitted by transmitter/receiver 140 to base unit 160.

Strain gauges 100 determine whether pressure is being put on pen tip 180. Thus, if the user is writing on paper 190, strain gauges 100 register the pressure to indicate that a stroke is being made. Otherwise, strain gauges 100 indicate that no stroke is being made and position information is not recorded. The stroke can then be processed and recorded either in base unit 160 or in pen 10.

In an alternative embodiment, accelerometers may be used instead of strain gauges. The accelerometers monitor acceleration of the tip of the pen, as opposed to the pressure on the tip of the pen. In fact, using the accelerometers does not require the pen tip to touching anything, thereby eliminating any need for pressure sensing. In one embodiment, three gyros and three accelerometers are used to determine when strokes are being made by a user.

An alternative implementation of a position sensor system described as used in a writing instrument is disclosed in a U.S. patent application Ser. No. 08/551,535, entitled "MANUAL ENTRY INTERACTIVE PAPER AND ELECTRONIC DOCUMENT HANDLING AND PROCESSING SYSTEM" filed Nov. 1, 1995.

Multiplexer 210 selectively couples outputs of fine position sensors 170, gyroscopes 120, or strain gauges 100 to transmitter/receiver 140 in response to signals generated by control unit 220. Control unit 220 generates control signals to alternate the coupling of the sensors to transmitter/receiver 140 such that data from the sensors is transmitted by transmitter/receiver 140. Transmitter/receiver 140 transmits data output by multiplexer 210, which is received by base unit 160.

Data from the fine position sensors 170, gyroscopes 120 and strain gauges 100 are transmitted to base unit 160 to provide the stroke data that form a message. Base unit 160 processes the strike data and establishes a communications link to send the data to be faxed.

Figure 3:
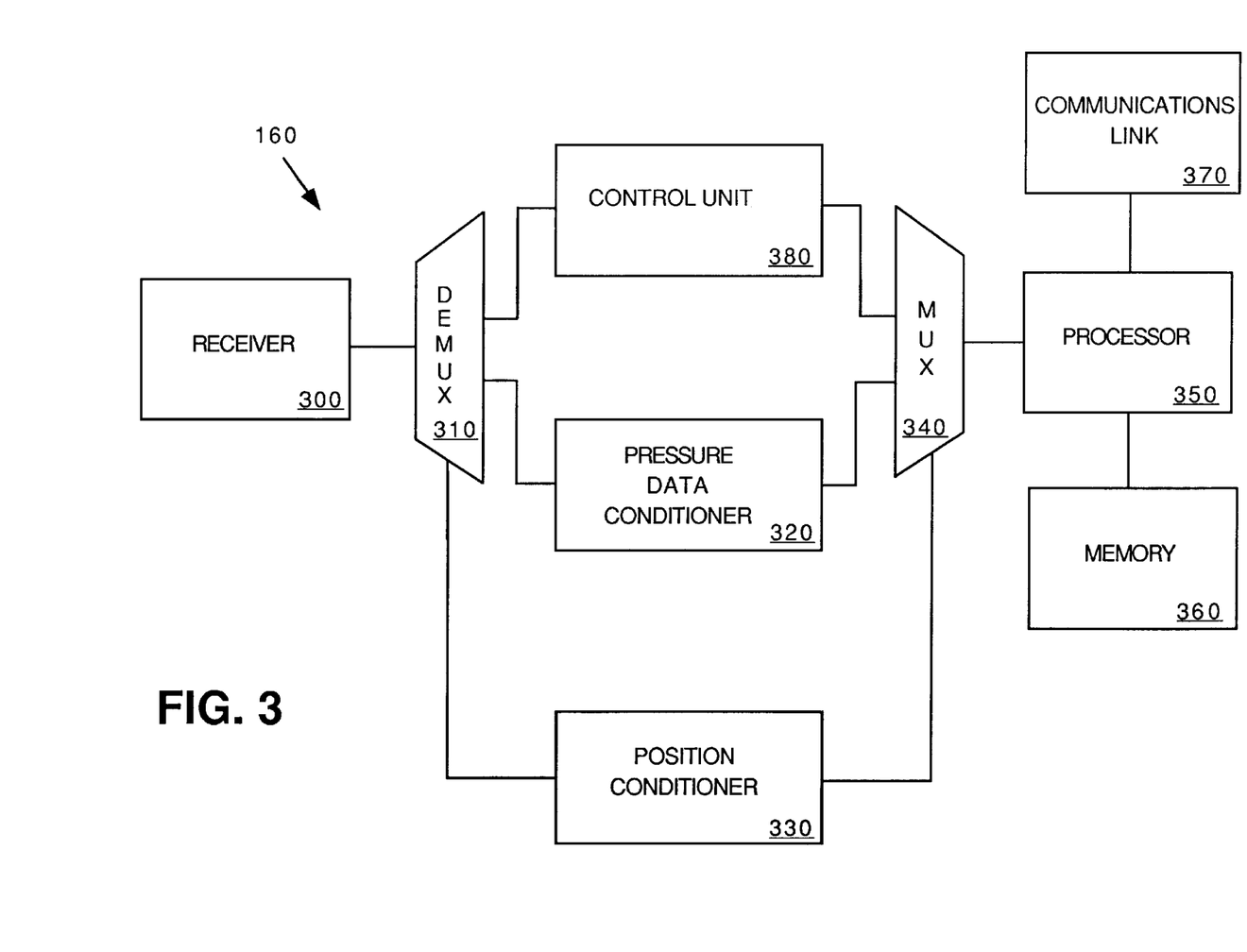
FIG. 3 is a block diagram of one embodiment of base unit 160 according to the present invention.

FIG. 3 is a block diagram of one embodiment of base unit 160 according to the present invention. In one embodiment, base unit 160 comprises receiver 300 coupled to demultiplexer 310, which channels data from receiver 300 to either pressure data conditioner 320 or position data conditioner 330, in the appropriate manner. The outputs of pressure data conditioner 320 and position data conditioner 330 are coupled to multiplexer 340, which selects an input to be coupled to processor 350. Control unit 380 generates signals to control demultiplexer 310 and multiplexer 340. Memory 360 is also coupled to processor 350.

Receiver 300 receives signals from transmitter/receiver 140 in pen 10. Receiver 300 is selectively coupled to pressure data conditioner 320 and to position data conditioner 330 by demultiplexer 310, such that data from strain gauges 100 are transferred to pressure data conditioner 320 and data from gyroscopes 120 and fine position sensors 170 are transferred to position data conditioner 330 at appropriate times.

The outputs of pressure data conditioner 320 and position data conditioner 330 are selectively coupled to processor 350 via multiplexer 340. Processor 350 receives and processes data from pressure data conditioner 320 and position data conditioner 330. Processor 350 processes the data received to generate a data stream to communicate the message written on paper 190 to a designated party via communications link 370. Processor 350 accesses memory 360 to process pressure data and position data. In this manner, pen 10 allows a user to write a message on an ordinary piece of paper (or other surface) that is then sent via a fax protocol to a designated recipient.

Although FIG. 3 is one possible embodiment, other embodiments are possible. For example, demultiplexer 310, pressure data conditioner 320, position data conditioner 330, multiplexer 340, and control unit 380 may be a portion of receiver 300 or of processor 350. In another example, pressure data conditioner 320 is replaced by an acceleration data conditioner. Alternatively, some of the elements may be a portion of receiver 300, while others are a portion of processor 350. In alternative embodiments, base unit 160 may provide handwriting recognition and some of the components in FIG. 3 may be part of pen 10.

Figure 4:
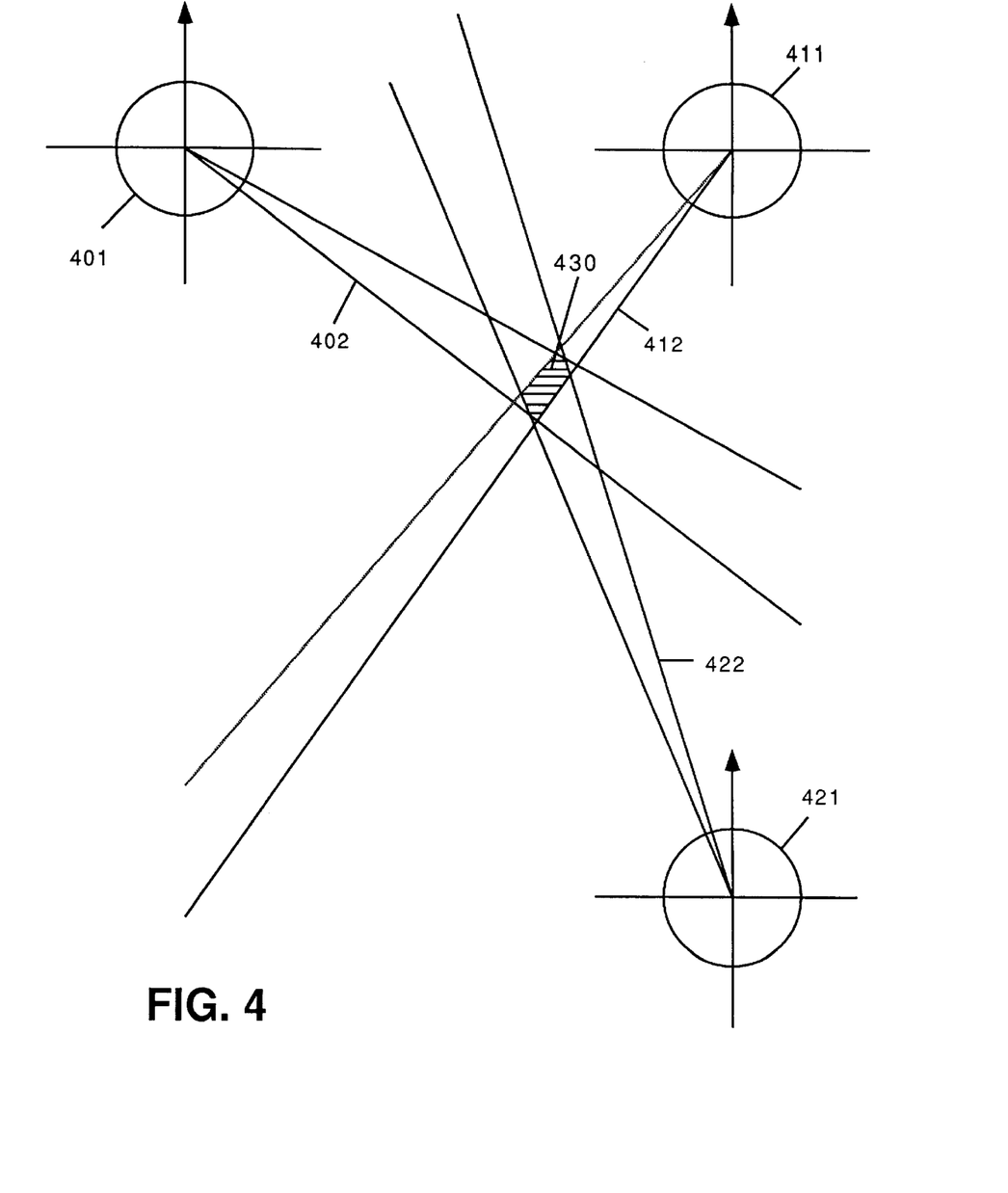
FIG. 4 illustrates external sources and their coverage in one embodiment of an infrared (IR) tracking system of a pen-based faxing system according to the present invention.

FIG. 4 illustrates the use of an alternative embodiment in which base unit 160 is equipped with an infrared (IR) detector that detects the movement of pen 10. In this embodiment, pen 10 does not contain gyroscope 120, fine position sensors 170 or strain gauges 100. The position of pen 10 is determined by a plurality of IR radiating scanning sources.

When base unit 160 is equipped with an infrared detector, a multiplicity of two or more external IR radiating scanning sources located at predetermined positions can be used to track the position of pen 10 by using triangulation techniques that measure the angle at which each IR scanning source illuminates pen 10. Alternatively, pen 10 can be equipped with an IR transmitter and two or more external scanning receivers located at prescribed positions can be used to track the position of pen 10 by triangulation. FIG. 4 shows the geometry of an IR tracking system using three external positions 401, 411, and 421. Each position has a directive scanning beam (receiving or transmitting) 402, 412, and 422 associated respectively with positions 401, 411, and 421. Shaded area 430 represents the intersection of the beams and corresponds to the position of pen 10.

Sending a Facsimile Transmission

Figure 5:
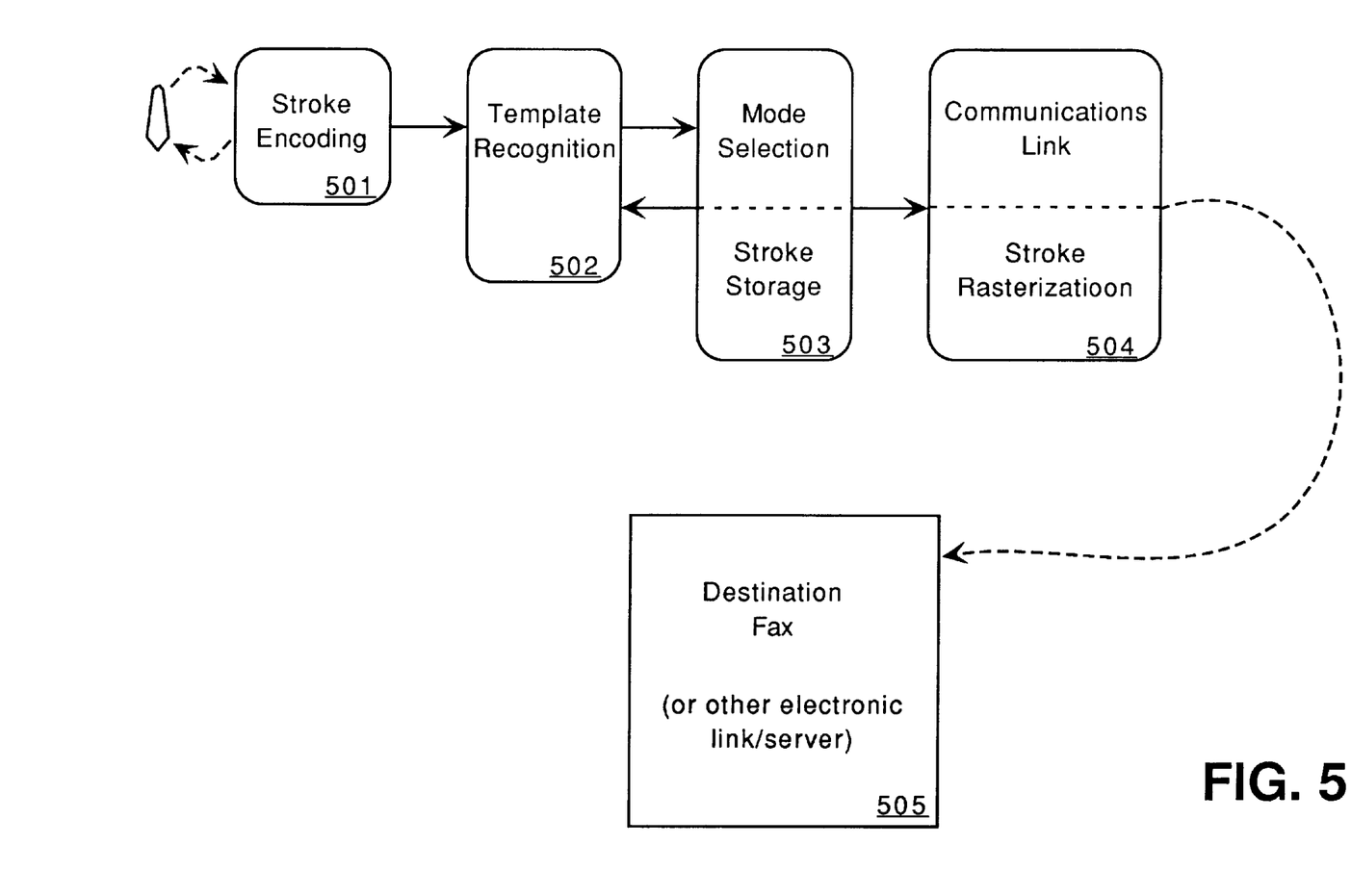
FIG. 5 is a data flow diagram for the pen-based faxing of the present invention.

FIG. 5 is a data flow diagram for the pen-based faxing of the present invention. Referring to FIG. 5, the process of the present invention begins with the motion of the pen being translated into a stroke representation (processing block 501). Next, the strokes are compared with the current active templates (processing block 502). One such comparison process is described below in conjunction with FIG. 7.

Strokes are then stored until a later time period (processing block 503) when a communications link is established and the strokes are rasterized for transmission (processing block 504). The system of the present invention attempts to make a communication connection to a commumication grid (through, for example, wireless, cellular, or RJ11)). Once connected, the system attempts to establish fax (or email or other communication) link to the destination. In one embodiment, a central service may act as an intermediary (or delivery agent) for the pen. In this case, the pen connects and downloads data to the service, which then forwards the message appropriately.

Once a communication link has been established, a rasterized version of strokes is generated. For each raster line, the present invention checks which strokes cross that line (and where), turn those pixels black, while leaving the others white. Note that in other embodiments, a rasterized version is not required.

The result of the process is a destination fax (or other electronic link/server), shown as block 505.

Prior to the stroke encoding, an initiate command is issued by the user. In one embodiment, the initiate command may be a template gesture that the user makes with the pen to indicate that a message is to follow. The template gesture may be recognized by the pen using standard template matching or other pattern recognition techniques. In one embodiment, the template gesture may be a standard form, such as writing "TO:", drawing a predefined graphic, or can be special spatio-temporal gesture adapted or trained to an individual user. In one embodiment, once recognized, the system may respond with a sound (e.g., beep) or some other feedback (e.g., light, blinking light, etc.) to indicate that it is in message mode.

After providing the initiate command, a recipient or destination is specified. The destination can be specified as a name template, a name plus a number, or just a number. In one embodiment, if a name and number are specified, the system stores the name for future template matching. Digits can be recognized by character recognition, or written is a special, easy to decode vocabulary. If the pen system includes a small CCD, recipients may be indicated simply by scanning the appropriate entry in an address book.

Note that the recipient/destination may be specified at a later time and/or may be set off with another template (e.g., set of characters, boxed, etc.).

After specifying the recipient, the message is created by recording strokes. In one embodiment, strokes are recorded until an "END" template is matched. A compact representation of the strokes (e.g., as coefficients of an oscillator mode) may be used to save space. Also strokes may be ordered by the Y coordinate to aid future rasterization.

The pen may use feedback beeps, a lighted display (e.g., LCD), or possibly speech to provide feedback to user for any or all of these operations. When asked for confirmation for actions, the user might use checkmarks, "OK", or X's, or other written indicia to indicate a response.

As an alternative, the pen may be coupled to a telephone (or fax machine). The user first dials the destination number and then proceeds to write the message. This method obviates the need for recognizing the "Initiate" commands or the destination number.

A user may wish to fax a message that they have already written. Assuming that the pen has stored the strokes comprising that message, a user could fax that stored message by issuing the fax command and specifying the stored message. For example, the user might write a unique number at the start of each page. This number would serve as the template for subsequent fax commands and faxing.

Figure 6:
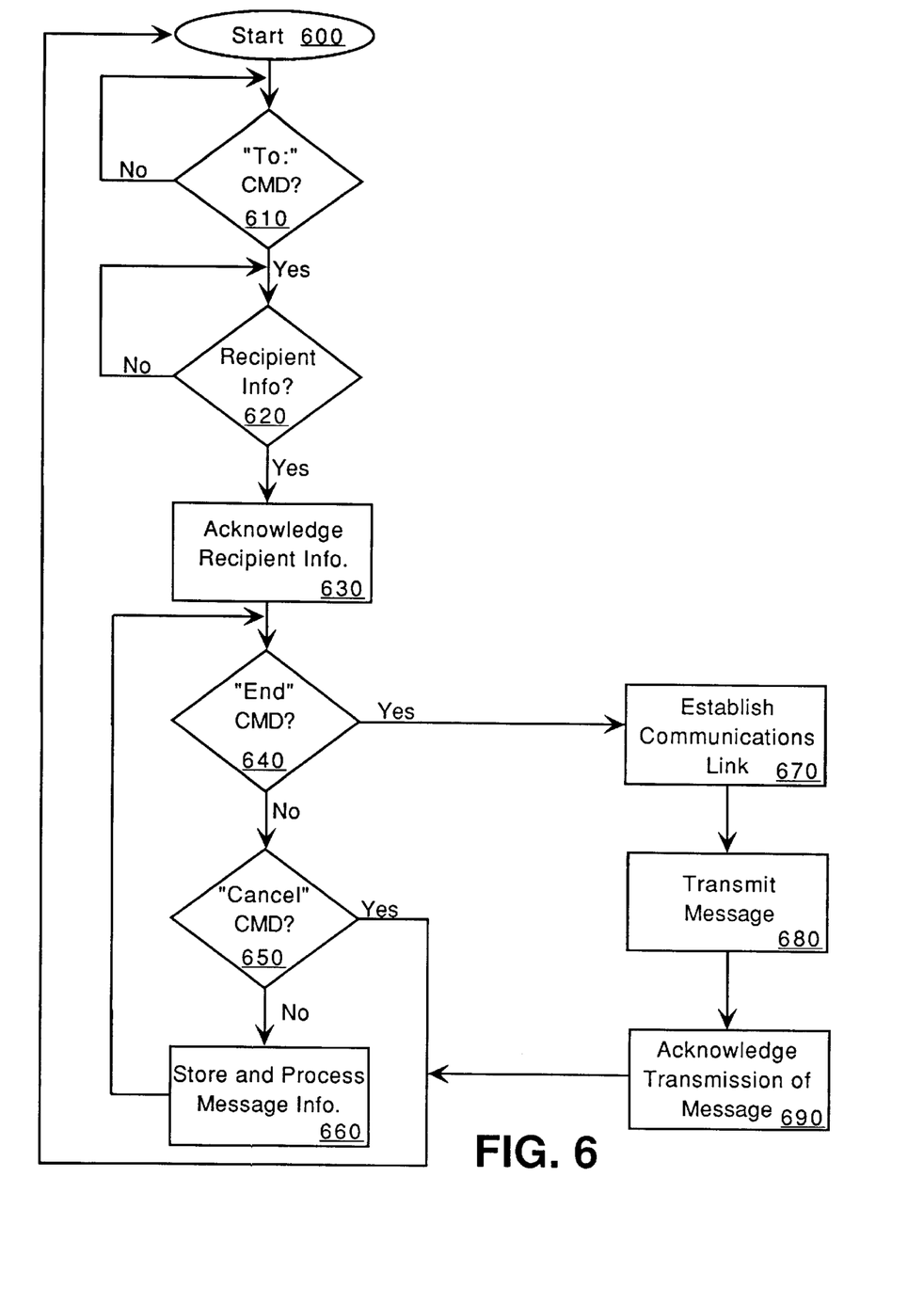
FIG. 6 is a flow diagram of one embodiment for faxing a message with a pen-based faxing system according to the present invention.

FIG. 6 is a flow diagram for faxing a message with a pen-based faxing system. The process starts at processing block 600, which may be accomplished by supplying power to pen 10 via a power switch, a reset switch or an appropriate command. Alternatively, pen 10 may power itself when touched by a user or when a spoken command is recognized.

Pen 10 stays in a ready or command mode until a command to begin the faxing process is recognized in processing block 610. According to one embodiment, the phrase "TO:" is the command that initiates the faxing process. Additionally, a user may be required to draw a box or other shaped graphic around any commands to aid in the recognition of commands. Alternatively, other commands such as, for example, "SEND" or "FAX" may be used instead of "TO:". Another alternative is that a button or switch or other manually manipulated device on pen 10 (not shown in FIG. 1) may be used to initiate faxing.

In processing block 620, the pen-based faxing system waits for the user to write information about the recipient of the message to be sent. This information may include a name, a fax number and any other relevant information. For example, a user may write:

"PAUL @ 555-1234".

Once recipient information is provided, the pen-based faxing system is able to complete a fax communication and a message may be written. Additionally, the pen-based faxing system may also provide a "speed dialing" function such that the user writes a number such as "4" or other symbol or sequence of symbols (e.g., letters, numbers, indicia, etc.) to recall recipient information corresponding to the designated recipient rather than writing the recipient information.

After the required recipient information is provided, the pen-based faxing system provides feedback to the user to acknowledge receipt of valid recipient information in processing block 630. This may be accomplished, for example, by lighting display 150 (or displaying a message on display 150, whichever is provided), providing a beep or a vocal acknowledgment. Alternatively, the user may have a device (e.g., watch, etc.) that is part of the pen-based faxing system that displays a message, beeps, etc. Note that the user feedback is not necessary for all embodiments.

The pen-based faxing system then waits for an "END" command in processing block 640 to indicate that the message is complete. During this time the user writes the message to be sent on a piece of paper or other surface. The strokes made by the user between the "TO:" command and the "END" command constitute the message to be sent. During this time the strokes for "TO:" are not treated as a command so that it can be used in the body of the message. The "END" command is an example where drawing a box around the commands may be useful so that END may be used in the message. Alternatively, "STOP", "FAX", "SEND" or other command may be used in place of "END" to indicate the conclusion of the message. Also, a button (not shown in FIG. 1) may be clicked or double clicked to indicate that the message should be sent. The pen may include other manual devices to perform the same function.

It should be noted that words are not required for the start and stop message commands. Shapes or symbols may be used instead.

Prior to the "END" command, the pen-based faxing system monitors the strokes being made for a "CANCEL" command that indicates that the user wishes to abandon the message being written. This is indicated by processing block 650. As with the "TO:" and "END" commands, "CANCEL" may be replaced by such words as "NO", "ABORT", "UNDO", etc., or by manipulating manually a device (e.g., button) on the pen.

If neither an "END" command nor a "CANCEL" command has been recognized, the pen-based faxing system stores and processes message information from the strokes made by the user in processing block 660. This storing and processing my be accomplished in pen 10 or in base unit 160, or in some combination of these elements.

The pen-based faxing system may also provide a stored message function in much the same that a speed dialing function may be provided where a user writes a number or a code of a message that is sent to the designated recipient. The message is then retrieved from memory either in pen 10 or base unit 160 and sent without requiring the user to write out the complete message again.

Once an "END" or equivalent command is recognized, a communications link is established in processing block 670. This may be accomplished, for example, via a wireless modem in either pen 10 or base unit 160, or via a telephone line or an electronic mail interface or any other communications link capable of transmitting data.

The message is then transmitted via the communications link in processing block 680. Once the message is transmitted or it is determined the message cannot be transmitted, feedback is provided to the user in processing block 690. This feedback may be provided via the methods described with respect to acknowledgment of the recipient information in processing block 630 or by other methods. After the message is sent or aborted, the pen-based faxing system returns to processing block 600 in which it waits for a "TO:" or equivalent command.

Figure 7:
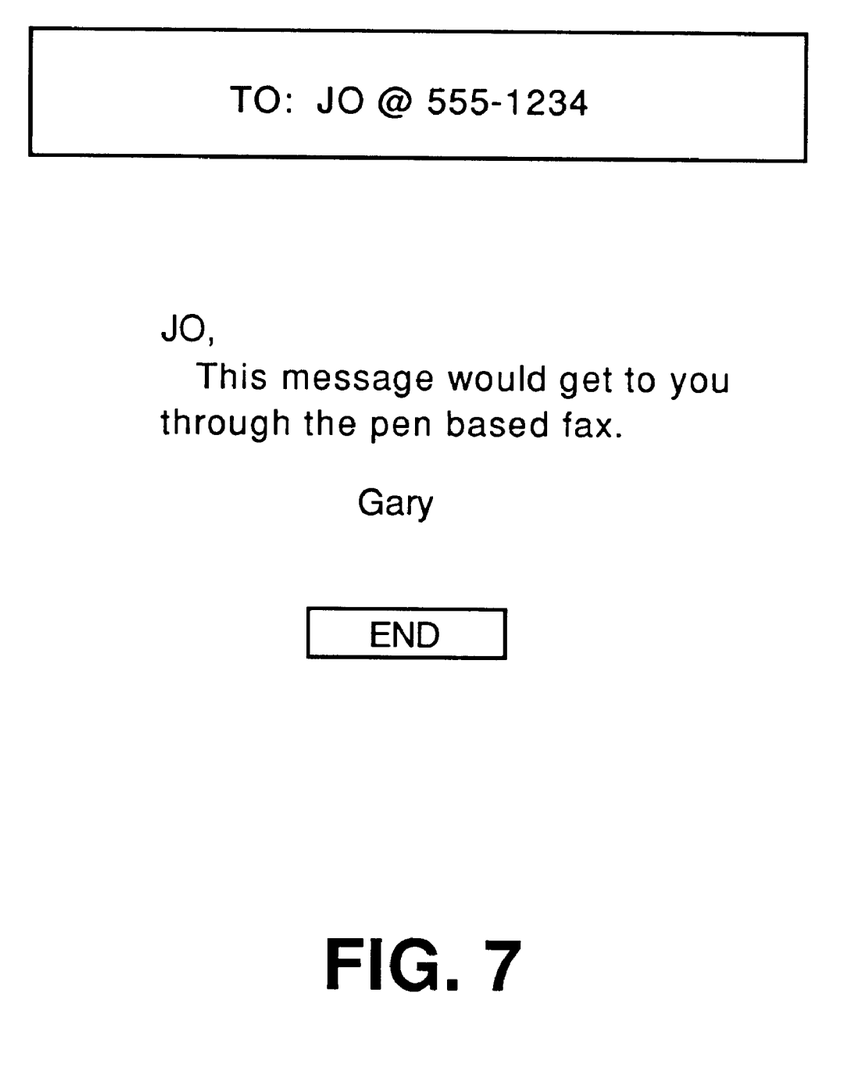
FIG. 7 illustrates an exemplary fax.

FIG. 7 illustrates an example fax document with both the start (TO:) and stop (END) commands.

Figure 8:
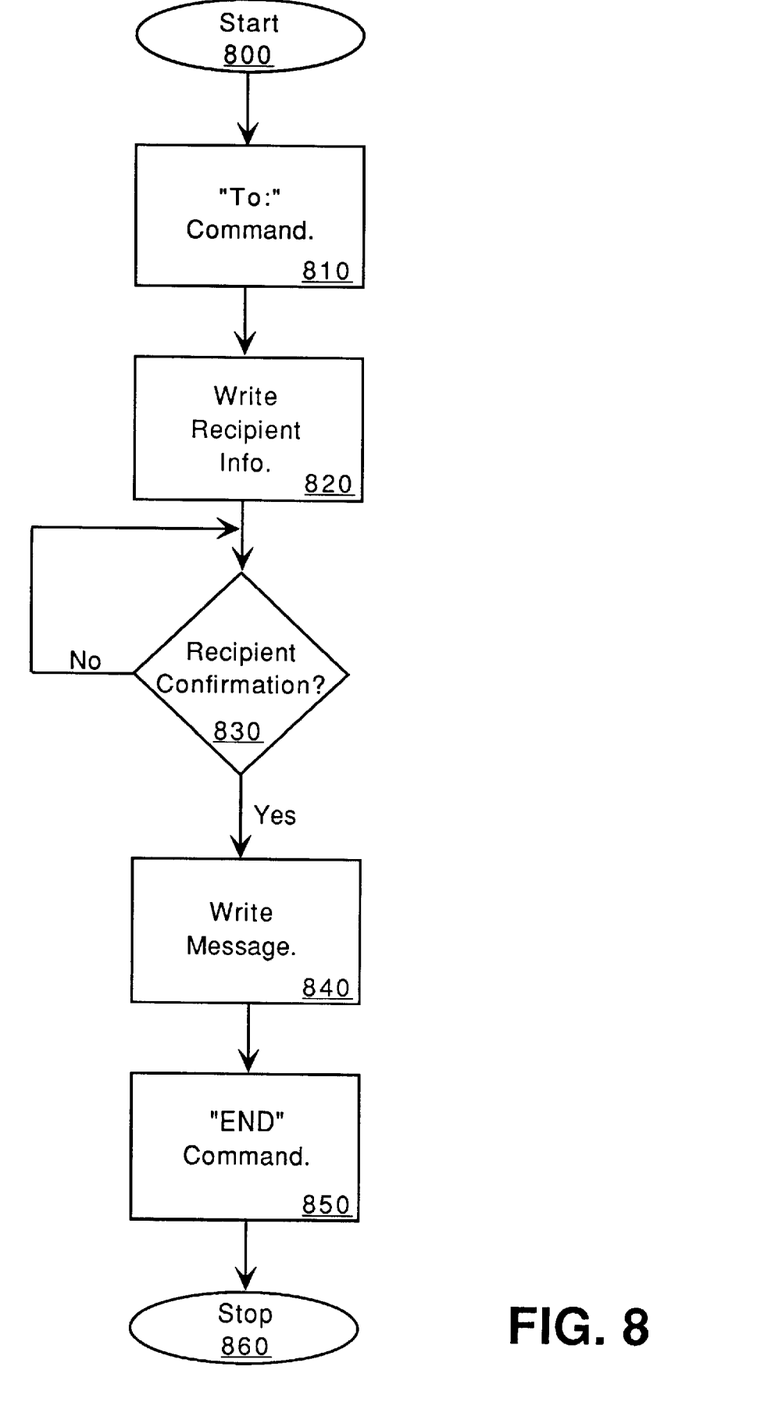
FIG. 8 is a flow diagram of one embodiment for using a pen-based faxing system according to the present invention.

FIG. 8 is a flow diagram for using a pen-based faxing system. In step 800 the user activates the pen-based faxing system. This may be accomplished, for example, by supplying power to the system or by clicking a button (not shown in FIG. 1) on either pen 10 or a button (not shown in FIG. 1) on base unit 160. Alternatively, power may be automatically supplied when a user touches pen 10 or speaks a predetermined voice command.

After the pen-based faxing system is initiated, the user writes a "TO:" or equivalent command in step 810. The user then writes the necessary recipient information, such as a name and a fax number in step 820. After receiving confirmation of the recipient information in step 830, the user is ready to write the message to be faxed.

In step 840, the user writes the message to be faxed. Any time during steps 800–840, the user may write a "CANCEL" or equivalent command to abort sending the message. For simplicity, the cancellation step has not been included in FIG. 8.

After the message to be sent has been written, the user writes an "END" or equivalent command in step 850. This indicates to the pen-based faxing system that the message has been written and is now ready to be sent. According to one embodiment, the pen-based faxing system provides feedback to the user to indicate whether the message has been sent successfully; however, the user is not required to wait for this feedback before engaging in other activities. In one embodiment, this feedback is not provided.

Figure 9:
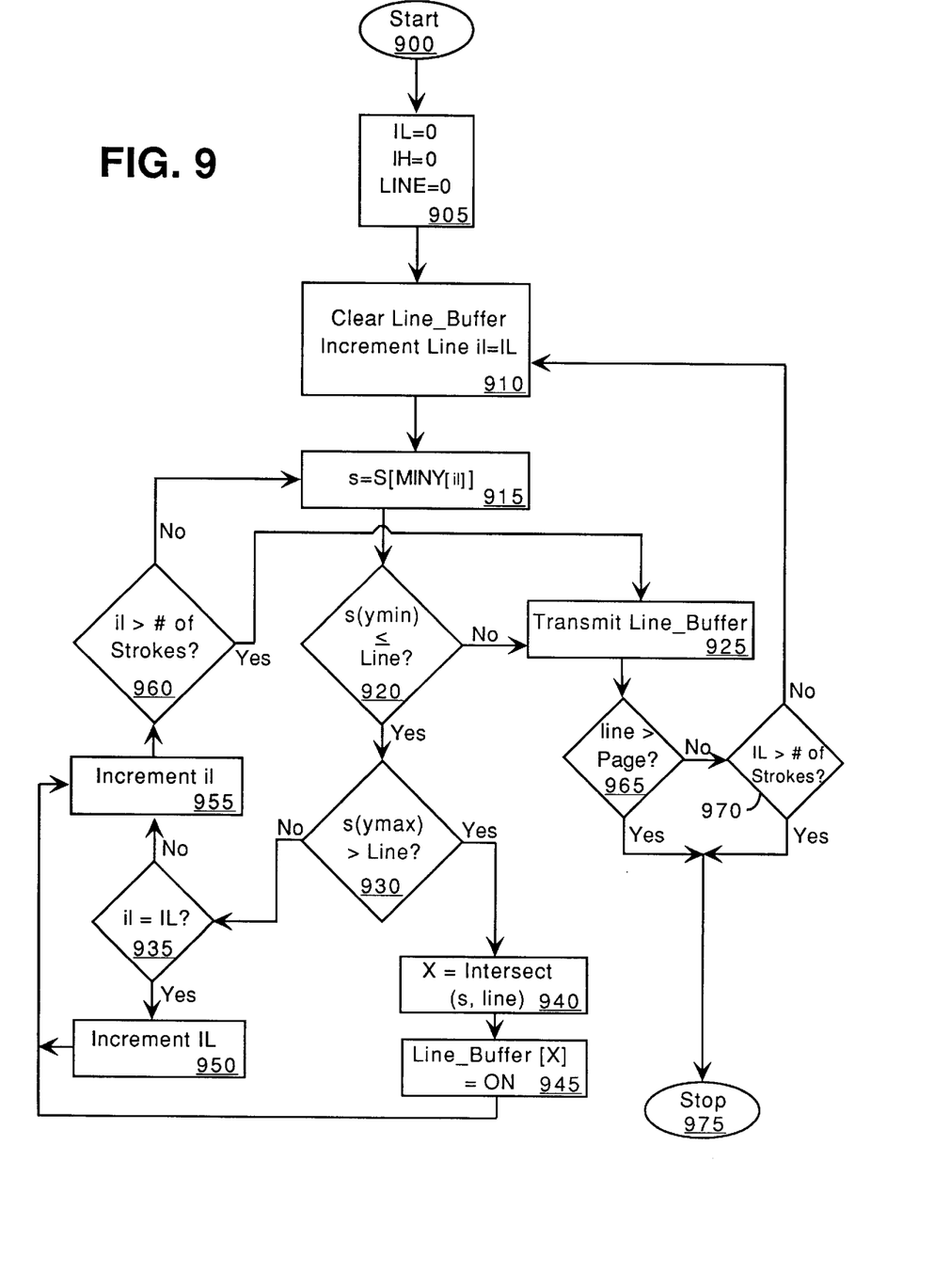
FIG. 9 is a flow diagram of one embodiment for processing strokes of a pen-based faxing device according to the present invention.

FIG. 9 is a flow diagram of one embodiment for processing strokes of a pen-based faxing device according to the present invention. In the embodiment of FIG. 9 strokes made by a user are stored as curves and indexed by two lists, MINY and MAXY. Strokes in MINY are sorted by the minimum y, or vertical, value of the stroke. Strokes in MAXY are sorted by maximum y, or vertical, value of the stroke. However, alternative methods may also be used, such as handwriting recognition.

In step 900, the processing method is started. This may occur, for example, when the user writes an "END" command or double clicks a button on pen 10. Strokes may also be processed more often to reduce processing time between the time the "END" command is written and the time the fax is sent. In step 905 variables used to process stroke data are initialized. Thus, IL, IH and LINE are set to 0.

In step 910, the variable $LINE_{13}$ BUFFER is cleared so that a new line may be processed. The variable LINE is incremented to begin processing the next line and the variable il is set equal to IL to process the first stroke that has not been fully processed. In the first iteration, both il and IL are equal to zero; however, once the line at the maximum Y value of a stroke is reached, the variable IL is incremented. Incrementing IL has the effect of skipping the processing of a stroke. Because strokes are ordered by minimum Y value in MINY, incrementing IL when the maximum Y value of a stroke is reached eliminates the stroke from future processing. Thus, processing power may be focused on the remaining strokes rather than the full set of strokes.

In step 915, a temporary variable s is assigned the stroke to be processed. Thus, in the first iteration, s indicates the stroke having the lowest Y value.

In step 920 the selected stroke indicated by s is evaluated to determine whether the minimum Y value of that stroke is less than or equal to the line being processed. If not, the variable $LINE_{13}$ BUFFER is transmitted. Thus, if the stroke with the lowest Y value does not intersect the line processed, no stroke intersects the line and that information is transmitted in $LINE_{13}$ BUFFER.

Step 925 is performed only if the result from step 920 is affirmative. Step 925 determines whether the maximum Y value of the stroke indicated by s is greater than the line processed. If so, the stroke intersects the line and possibly other lines, so processing of the stroke is not complete. If not, processing of the stroke is complete and IL can be incremented.

If the maximum Y value of a stroke is greater than the line processed, in step 940, X is set to the intersection of the stroke indicated by s and the line processed. The variable X corresponds to the horizontal position of the stroke. The entry in $LINE_{13}$ BUFFER corresponding to the Y value of the stroke is assigned X to indicate the horizontal position of the stroke. Thus, the position of the stroke in two dimensions (i.e., X and Y, or horizontal and vertical) is stored in $LINE_{13}$ BUFFER.

In step 955, the variable il is incremented to index the next stroke in MINY. Thus, if another stroke has a minimum Y value less than the line processed, that stroke is processed. If not, the next stroke that intersects the current line is processed. This is determined in steps 920 and 925 as discussed above.

After il is incremented it is compared to the number of strokes to be processed in step 960. If il is greater than the number of strokes, all of the strokes have been processed and $LINE_{13}$ BUFFER is transmitted in step 925. If il is not greater than the number of strokes, steps 915 to 955 are repeated for the next stroke in MINY.

If, in step 930, it is determined that the maximum Y value of a stroke is greater than the current line, then the stroke has been completely processed and IL is incremented in step 950. Thus, when step 910 is performed subsequently il is set equal to the new value of IL and processing continues for the strokes that have not been fully processed.

After $LINE_{13}$ BUFFER is transmitted, the pen-based faxing system determines whether the current line is greater than the number of lines on the page in step 965. If so, processing ends in step 975.

If the current line is not greater than the number of lines on the page, the system determines whether IL is greater than the number of strokes. If so, all of the strokes have been processed and processing stops in step 975. If not, steps 910 to 970 are performed for the next line.

Thus, the present invention provides a number of advantageous features. First, the present invention allows users to write messages as they normally do, on paper in their own handwriting. The present invention also does not require a user to learn how to work a new device or applications program.

A Note on Template Recognition

There are only a few symbols that need to be recognized by the pen system, the "initiate" command, the "end" command, and some specification of the destination. For the commands, simple template matching should be sufficient. Depending on the mode, the system would simply monitor the strokes looking for a particular template. These templates can be designed so they are easily distinguished from the message itself. For example, a "TO:" would be a horizontal stroke, followed by a vertical stroke, followed by a stroke which overlaps itself, followed by two aligned points. For a system which models strokes as a system of coupled oscillators, the representation for these would be quite simple. (This representation also aids scale invariance.) To further improve recognition rates, a box may be drawn around all commands-recognizing such a large box would also be simple matter.

Destination recognition could also use template matching for numbers and/or names. Names could be matched against previous entries by a user. Much work has gone into handwritten digit recognition, and templates from existing systems could be used. If the pen includes a CCD, the destination might be scanned as a barcode from a printed address book.

Of course, other pattern recognition techniques could be used, such as neural networks, hidden markov models, etc. Furthermore the system could adapt to a particular user. In any case, the very small vocabulary and strong context dependence should lead to very good recognition rates even with somewhat simplistic recognition techniques.

If the pen were directly coupled to a phone, of course, no recognition would be necessary.

The present invention is also different from conventional fax machines in that no paper scanner is needed. Also there is no need to dial, feed paper, or perform any other action once message is written. Still further, faxes to be sent can be stored in a queue until communications link can be established. Stroke representation are much more compact than raster representations, thus less memory is required to store the fax. Moreover, the compact nature of the pen makes it eminently portable paper is no necessary, any surface will do.

The present invention also differs from personal computer (PC) or personal digital assistant (PDA) applications in that there is no application program and users do not navigate a window system or click on any buttons. Also general handwriting recognition is not necessary (only some simple template matching which is much easier). Message information is stored more compactly as strokes and rasterized on the fly in the present invention as opposed to PC or PDA applications. Any surface can be used in the present invention, and the writing area not limited to size of screen. Lastly, a hardcopy is available as the user writes the message.

In addition to the standard handwritten faxes, the present invention could also serve additional functions. For example, existing documents or objects could be faxed by "tracing" them with the pen. Simple "todo" messages could be sent to oneself. While on a trip, an individual might scribble messages to serve as reminders upon returning home, where they would be waiting on one's desktop.

Being as portable as a pen and as efficient as writing on paper, the system described herein simplifies sending messages while other functions, such as printing, could be accomplished in much the same manner.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

Thus, a method and apparatus for faxing has been described.

What is claimed is:

1. A method for sending a facsimile of a written message comprising:

recording strokes that set forth the message with a writing instrument used to make the strokes, the writing instrument monitoring its own position; and sending the strokes as part of the facsimile to a recipient designated by the strokes, the facsimile comprising of strokes made with the writing instrument as determined by the position of the writing instrument.

2. The method defined in claim 1 further comprising writing a first command to initiate the recording of strokes.

3. The method defined in claim 1 further comprising the writing instrument communicating with a facsimile machine.

4. The method defined in claim 1 wherein sending comprises sending a rasterized version of the message.

5. The method defined in claim 1 further comprising:
writing a first command to indicate to the writing instrument that the message follows; and
writing a second command to indicate an end of the message.

6. A system for sending a facsimile of a message comprising:

a pen to monitor its own position, the pen having:
a plurality of position sensors to sense strokes made with the pen and to generate position data in response to the strokes, and
a transmitter coupled to the plurality of position sensors to transmit the position data; and a base unit having:
a receiver to receive position data transmitted by the transmitter, and
a communications interface coupled to the receiver to send the facsimile of the message in response to position data received by the receiver, the message comprising strokes made with the pen, wherein the message is communicated to a recipient designated by strokes made with the pen.

7. The system of claim 6, wherein the plurality of position sensors comprise a plurality of strain gauges coupled to a tip of the pen, wherein the strain gauges monitor pressure placed on the tip of the pen.

8. The system of claim 7 wherein the plurality of sensors further comprise a plurality of gyroscopes to detect a pitch, a yaw, and a roll of the pen.

9. The system of claim 7, wherein a plurality of infrared (IR) radiating scanning sources communicate with the base unit and are located at a plurality of predetermined positions to track a position of the pen and to generate an output in response to the position of the pen.

10. The system of claim 6, wherein the plurality of position sensors comprise a plurality of accelerometers coupled to a tip of the pen, wherein the accelerometers monitor acceleration of the pen.

11. The system of claim 6, wherein the base unit further comprises:
a processor coupled to the receiver and to the communications interface to process the position data to generate the facsimile to be sent via the communications interface; and
a memory coupled to the processor.

12. The system of claim 6, wherein the base unit further comprises a transmitter coupled to a processor, the pen further comprises a receiver coupled to a display.

13. An apparatus for sending a facsimile of a message, wherein the message is written with a pen that transmits stroke data, comprising:
means for sensing a plurality of strokes made by the pen by monitoring positioning of the pen;
means for transmitting position data in response to the plurality of strokes;
means for sending a facsimile of the message consisting of strokes made with the pen to an intended recipient designated by strokes made with the pen in response to the position data.

14. The apparatus of claim 13, wherein the means for sensing further comprises:
means for detecting pen position by monitoring a pitch, a yaw, and a roll of the pen; and
means for detecting pressure on a tip of the pen.

15. The apparatus of claim 13, wherein the means for sensing further comprises:
means for detecting the pen position via a plurality of infrared (IR) radiating scanning sources; and
means for detecting pressure on a tip of the pen.

16. The apparatus of claim 13, wherein the means for sensing further comprises:
means for detecting pen position by monitoring a pitch, a yaw, and a roll of the pen; and
means for monitoring acceleration of a tip of the pen.

17. The apparatus of claim 13, wherein the means for sensing further comprises:
means for detecting the pen position via a plurality of infrared (IR) radiating scanning sources; and
means for monitoring acceleration of a tip of the pen.

18. The apparatus of claim 13, wherein the means for sensing further comprises:
means for sensing an initialization sequence;
means for sensing recipient information corresponding to a plurality of identifiers of an intended recipient of the message;
means for processing strokes corresponding to the message;
means for sensing an ending sequence; and
means for transmitting stroke data.

19. A method of sending a facsimile of a message, wherein the message is written with a pen that transmits stroke data, the method comprising:
sensing a plurality of strokes made by the pen by monitoring positioning of the pen;
transmitting position data in response to the plurality of strokes; and sending a facsimile of the message consisting of strokes made with the pen to an intended recipient designated by strokes made with the pen in response to position data.

20. The method of claim 19, Wherein sensing a plurality of strokes comprises:

detecting pen position by monitoring a pitch, a yaw, and a roll of the pen; and detecting pressure on a tip of the pen.

21. The method of claim 19, wherein sensing a plurality of strokes comprises:

detecting pen position via a plurality of infrared (IR) radiating scanning sources; and detecting pressure on a tip of the pen.

22. The method of claim 19, wherein sensing a plurality of strokes comprises:

detecting pen position by monitoring a pitch, a yaw, and a roll of the pen; and detecting acceleration of a tip of the pen.

23. The method of claim 19, wherein sensing a plurality of strokes comprises:

detecting pen position via a plurality of infrared (IR) radiating scanning sources; and detecting acceleration of the pen.

24. The method of claim 19, wherein sensing a plurality of strokes comprises:

sensing an initialization sequence;

sensing recipient information corresponding to a plurality of identifiers of an intended recipient of the message;

processing strokes corresponding to the message;

sensing an ending sequence; and transmitting data comprising the strokes.

* * * * *